United States Patent [19]

Challis

[11] Patent Number: 4,865,496
[45] Date of Patent: Sep. 12, 1989

[54] BORING JIG APPARATUS

[75] Inventor: Brian Challis, Sandy, Utah

[73] Assignee: Challis Stairways, Inc., Sandy, Utah

[21] Appl. No.: 245,524

[22] Filed: Sep. 19, 1988

[51] Int. Cl.$^4$ .................................... B23B 45/14
[52] U.S. Cl. .................... 408/115 R; 144/106; 269/220; 269/282; 408/72 R; 408/112; 408/16
[58] Field of Search ............... 408/72 R, 72 B, 108, 408/716, 110–112, 115 R, 115 B, 103, 109, 16, 97; 409/178, 179; 144/104, 106; 269/219, 220, 279, 280, 282

[56] References Cited

U.S. PATENT DOCUMENTS

| | | | |
|---|---|---|---|
| 968,038 | 8/1910 | Everest | 269/220 |
| 2,602,238 | 7/1952 | Wellman | 408/115 R X |
| 2,849,900 | 9/1958 | Heidtman, Jr. | 408/112 |
| 3,534,639 | 10/1970 | Treichler | 408/112 |
| 3,626,513 | 12/1971 | Pytlak | 408/97 X |
| 3,635,571 | 1/1972 | Roberts et al. | 408/108 X |
| 4,199,283 | 4/1980 | Perry | 408/115 R |
| 4,277,208 | 7/1981 | Jackson et al. | 408/16 X |
| 4,291,870 | 9/1981 | Warde | 269/279 |
| 4,793,747 | 12/1988 | Reitz | 408/72 R X |

*Primary Examiner*—Steven C. Bishop
*Attorney, Agent, or Firm*—Thorpe, North & Western

[57] ABSTRACT

A jig used for precision boring of holes in a working surface of an elongate work piece includes a pair of mounting plates and an elongate connecting member for mounting the plates together in adjustable, spaced positions such that the plates face each other and can be moved in a direction toward and away from each other. Engagement pad members are attached to mutually respective, bottom sides of the pair of plates. The pad members are adapted to engage opposite sides of a work piece in firm engagement therebetween when the pair of plates are moved toward each other, with the work piece being disengaged when the pair of plates are moved away from each other. A guide member is mounted between the pair of plates and is adapted to guide a boring tool in a linear movement toward and away from a working face of the work piece. The guide member is mounted and positioned such that the linear movement of the boring tool lies in a plane passing generally through the longitudinal axis of the work piece. The mounting of the guide member further allows for movement of the guide member in an arcuate path such that the angle between the direction of linear movement of the boring tool and the longitudinal axis of the work piece can be selectively varied.

20 Claims, 4 Drawing Sheets

BORING JIG APPARATUS

BACKGROUND OF THE INVENTION

1. Field of the Invention

The present invention relates to apparatus for boring holes in elongate work pieces such as rails used in balustrades. In particular, the present invention relates to apparatus which can be used to bore a plurality of cylindrical holes in an elongate work piece, such as the rails (conceivably either the top or bottom rails) of a balustrade, wherein the respective holes are accurately positioned along the work piece and the longitudinal axes of the holes are inclined at a set, uniform angle relative to the longitudinal axis of the work piece.

2. State of the Art

Balustrades have been hand crafted by craftsmen for a very long time. Generally, the balusters have been attached to the rails of the balustrades by hand. It is common to provide a cylindrical bore or opening in the underside surface of a top rail or on the top surface of a bottom rail in those instances wherein a bottom rail is included in the balustrade. The end of the baluster commonly has the shape of a cylindrical dowel which is adapted to be received snugly within the bore or opening in the rail of the balustrade.

Heretofore, it has been the practice of the craftsman to drill the openings in the rails of the balustrade which he is constructing by hand, using eyesight to guide him in approximating the correct angle of the axis of the bore or opening. The skill of the artisan determined the quality of the joint between the baluster and the rail. In many instances, the joint will be so unsatisfactory that the rail must be discarded. Shop equipment can be used to drill the bores or openings in the rails, but to applicant's knowledge there is no teaching in the prior art of a portable jig apparatus that can be used in the field to drill accurately positioned bores or openings in the rails of a balustrade as the balustrade is being constructed.

3. Objectives

A principal objective of the invention is to provide a novel, portable jig apparatus which is easily attached to an elongate work piece, such as a rail used in making a balustrade, and which will allow for the accurate positioning of a tool for drilling a bore or opening in the rail at a preset angle to the longitudinal axis of the work piece.

A particular objective of the invention is to provide such a portable jig apparatus which has a guide member capable of precision guidance of an elongate boring tool in movement back and forth along the longitudinal axis of the boring tool, and wherein the guide member can also be adjusted to accurately select the desired angle of the axis of the elongate boring tool with respect to the longitudinal work surface of the work piece.

Another particular objective of the present invention is to provide such a portable jig apparatus which includes the primary guide member for guidance of a boring member relative to the longitudinal work surface of the work piece, and in addition further includes a secondary guide member for precision guidance of an elongate boring tool in substantially perpendicular movement with respect to the end of the work piece.

A further particular objective of the present invention is to provide such a portable jig apparatus which further includes an adjustable mounting means for mounting the jig apparatus to a wide variety of work pieces.

BRIEF DESCRIPTION OF THE INVENTION

The above objectives are achieved in accordance with the present invention by providing novel, unique jig apparatus used for precision boring of holes in the working surface of an elongate work piece. The jig apparatus comprises a pair of mounting plates and means for connecting the mounting plates together in adjustable, spaced positions such that the plates face each other and can be moved in a direction toward and away from each other.

Engagement pad members are attached to mutually respective, bottom sides of the pair of plates, with the pad members being adapted to engage opposite sides of a work piece in firm engagement between the pad members when the pair of plates are moved toward each other. The work piece is effectively disengaged when the pair of plates are moved away from each other.

The jig apparatus further includes a guide member having means for precision guidance of a boring tool in a linear movement toward and away from a working face of the work piece. The guide member is mounted in a position between the pair of plates such that the linear movement of the boring tool lies in a plane passing through the longitudinal axis of the work piece and extending perpendicular to the working face of the work piece. Means are provided for moving the guide member in an arcuate movement such that the angle between the direction of linear movement of the boring tool and the longitudinal axis of the work piece can be varied as desired.

In a preferred embodiment of the invention, the jig apparatus further comprises a secondary guide member which is adapted to lie adjacent to the end of the elongate work piece when the jig apparatus is mounted adjacent to the end of the work piece. The secondary guide member has a guide opening therein, and means are provided for adjusting the position of the guide opening so that it is in coaxial alignment with the longitudinal axis of the work piece. A boring tool can then be guided by the guide opening to drill a bore or cylindrical hole in the end of the work piece.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

Figure 8:
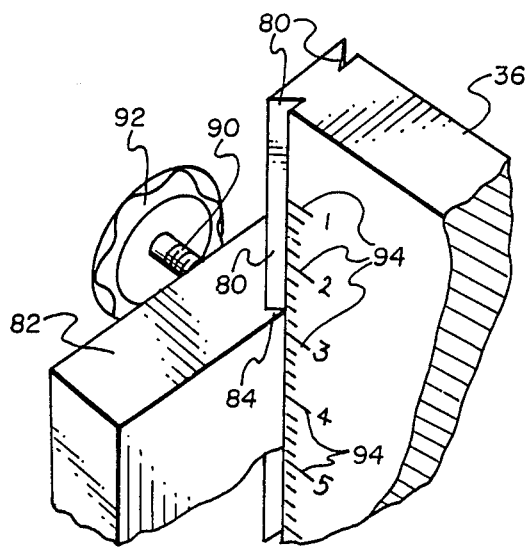
Figure 9:
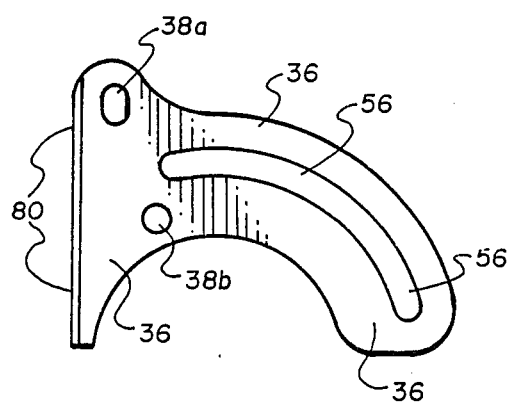

FIG. 8 is partial pictorial showing th sliding connection of the end plate to the guide member and further showing a graduated scale on the guide member which can be used with the upper edge of the end plate to indicate the position of the end plate relative to the guide member; and FIG. 9 is a side elevation of the support plate which forms a portion of the guide member of the jig apparatus of the present invention.

DETAILED DESCRIPTION OF THE ILLUSTRATED EMBODIMENTS

Referring to the drawings, there are shown two preferred embodiments of a boring jig apparatus of the present invention. In describing the two embodiments, with reference to the drawings, like parts of each embodiment will be identified and shown in the drawings with identical reference numerals. In accordance with one embodiment of the invention, a jig apparatus is provided for precision boring of holes in a working surface of an elongate work piece. In the second embodiment, a jig apparatus is provided for boring a hole in the end of an elongate work piece. As will become evident from the descriptions which follow, the two embodiments can be combined in one unit as actually shown in the drawings (see FIG. 3), or the second embodiment could be incorporated in a unit without the first embodiment (there is, however, no illustration in the drawings of apparatus consisting of only the second embodiment). Referring to the drawings, the apparatus comprises a pair of mounting plates 12 which are interconnected by appropriate means for maintaining the plates in adjustable, spaced positions so that the plates 12 face each other. The means for connecting the mounting plates 12 preferably comprises a pair of spaced, elongate members 14 upon which the respective mounting plates 12 are movably attached. The plates 12 are adapted to move toward and away from each other along the elongate members 14.

In a particularly preferred embodiment of the invention as illustrated, the means for connecting the mounting plates 12 together comprises the pair of elongate members 14 which take the form of threaded rods 14, a pair of spaced, oblong openings 16 in each of the mounting plates 12, and a pivot nut 18 (FIG. 4) in each of the oblong openings 16. The longitudinal axis of the first oblong opening 16 in each plate 12 is substantially parallel with the longitudinal axis of the second oblong opening 16 in the mutually respective plate 12.

Figure 4:
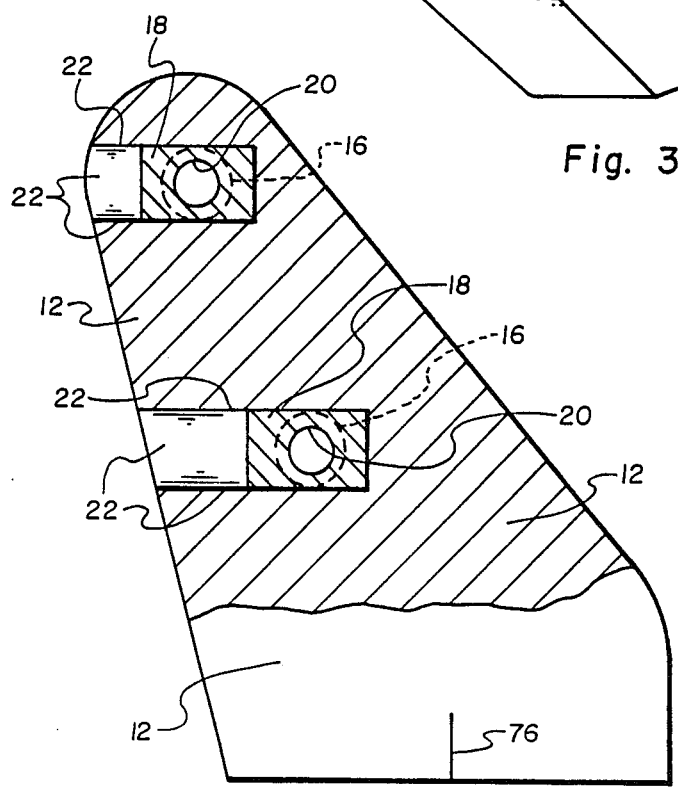
FIG. 4 is a vertical cross section taken along a plane between the opposite, broader, flat sides of a mounting plate of either of the embodiments of the boring jig apparatus of FIGS. 1 or 3.

As shown in FIG. 4, each oblong opening 16 (shown in dotted lines in FIG. 4) has a pivot nut 18 mounted therein, and each pivot nut 18 has an internally threaded opening 20. Pivot nuts are well known per se in the art and will be described only briefly herein. Each pivot nut 18 comprises a cylindrical member having the internally threaded opening 20 formed to be substantially perpendicular to the longitudinal axis of the cylindrical member. Cylindrical bores or holes 22 are machined to extend from one of the side edges of the respective mounting plate 12, and the pivot nuts 18 are received within such bores or holes 22. As can be seen from FIG. 4, the bores or holes 22 have a diameter substantially equal to the longitudinal dimension of the elongate openings 16, and the bores or holes 22 intersect the elongate openings 16 substantially perpendicular to the longitudinal axis of the elongate openings 16.

Figure 1:
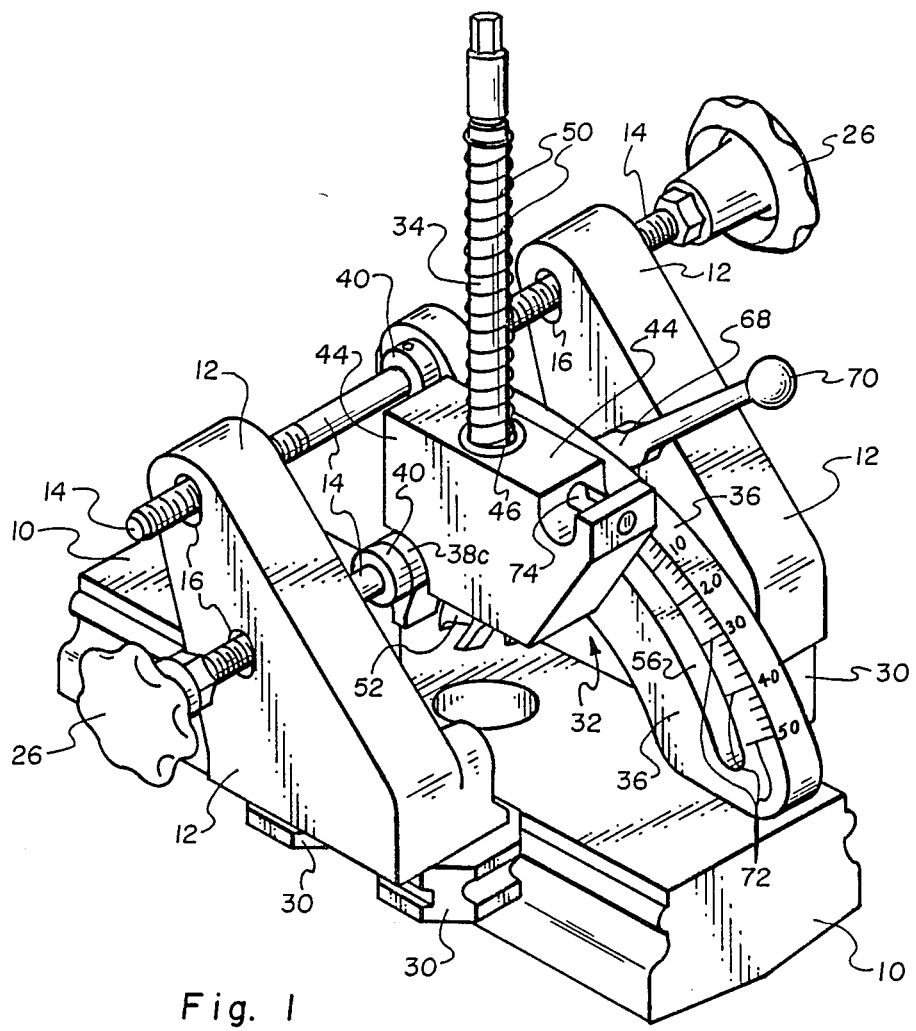
FIG. 1 is a pictorial representation of a preferred embodiment of a boring jig apparatus in accordance with the present invention.
Figure 2:
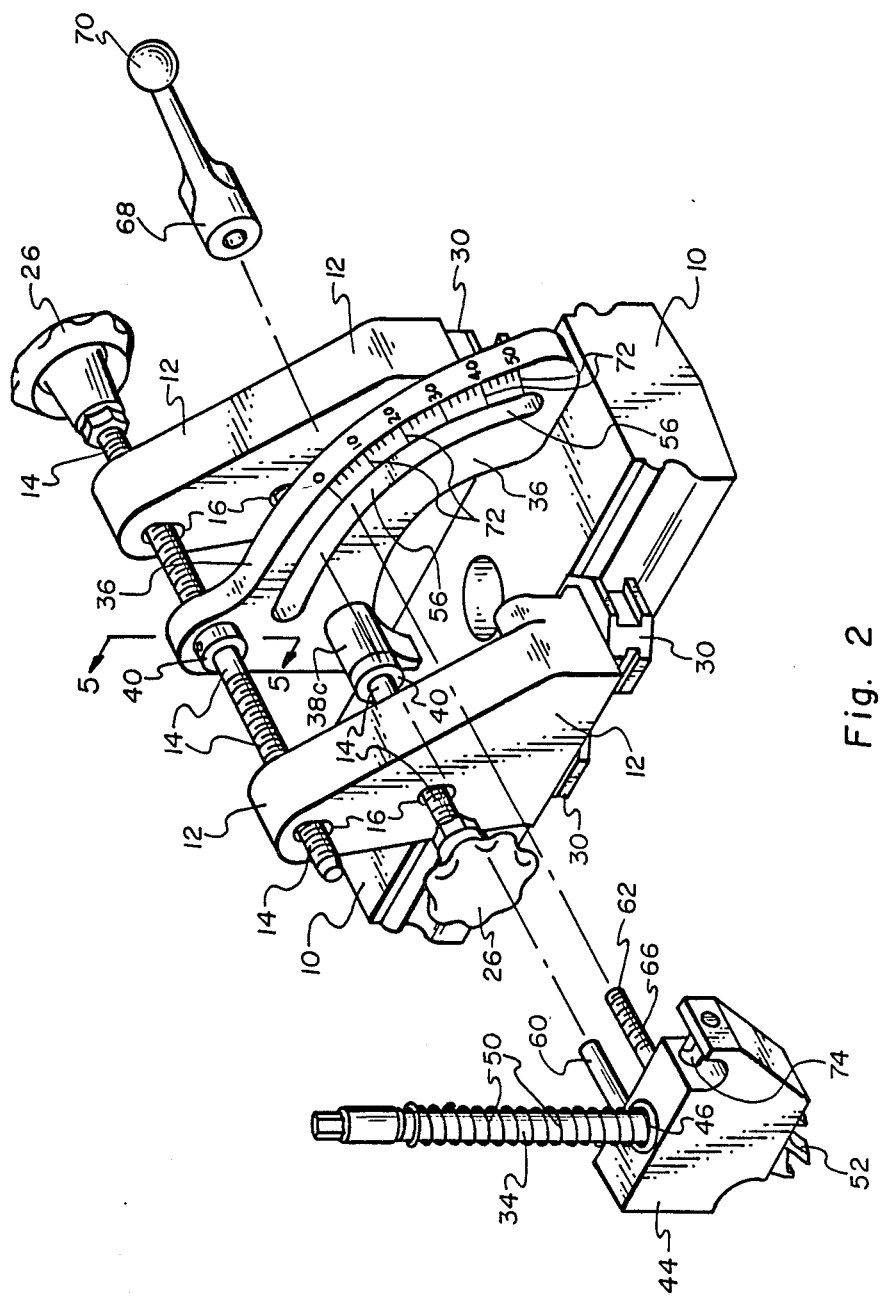
FIG. 2 is a view similar to that of FIG. 1 but shows the guide block exploded from the jig apparatus.
Figure 3:
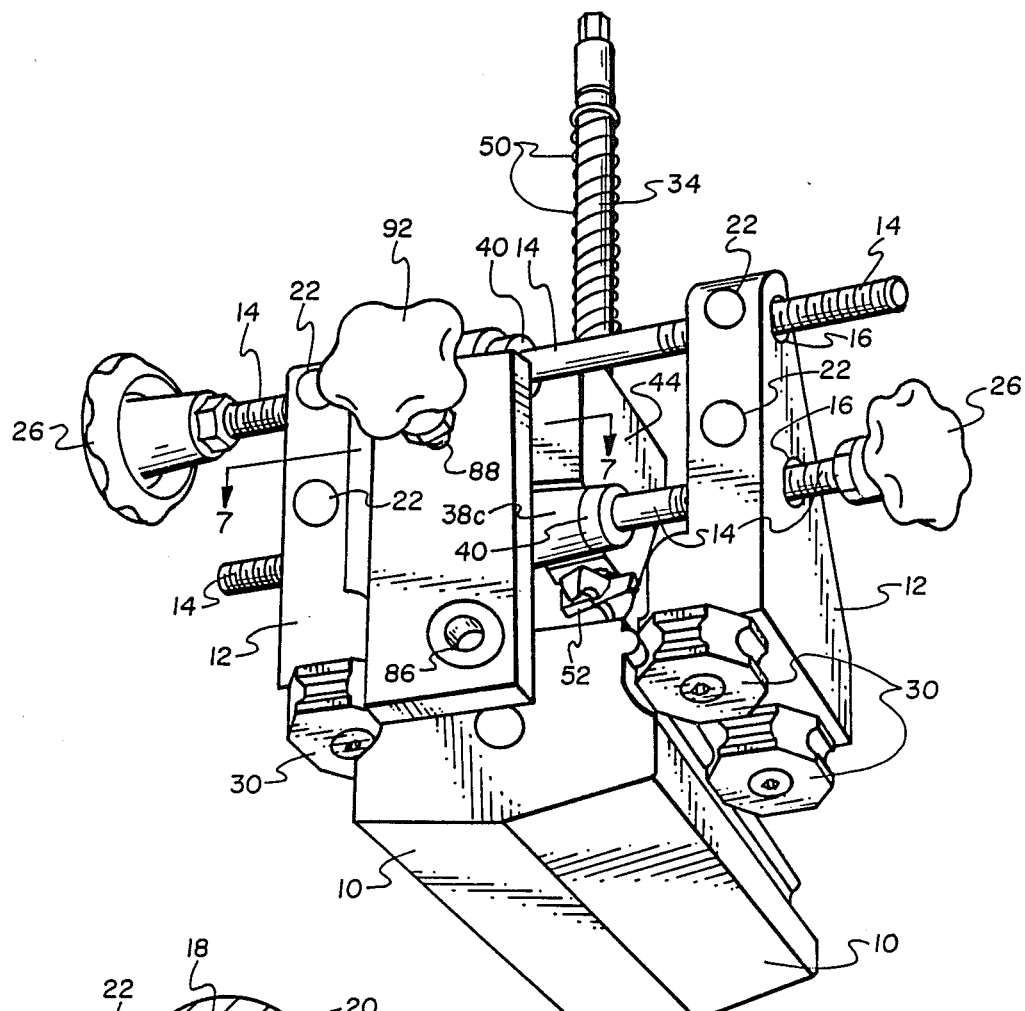
FIG. 3 is a pictorial representation of another preferred embodiment of a boring jig apparatus in accordance with the present invention which includes an end plate which is adapted to provide a guide means for drilling a cylindrical hole or bore in the end of an elongate work piece, with the novel apparatus being shown in working position adjacent the end of the work piece.

Each pivot nut 18 is of a size to freely rotate about its longitudinal axis when positioned within a respective bore or hole 22. Each pivot nut 18 is further mounted for pivotal movement within the respective oblong opening 16 such that the axis of the threaded opening 20 thereof moves in a plane which is parallel to the longitudinal, central axis of the respective oblong opening 16 and perpendicular t the longitudinal axis of the work piece 10 (the work piece 10 is shown in FIGS. 1-3). Each pivot nut 18 is retained within a mutually respective bore or hole 22 by mutually respective engagement with the elongate rods 14. Each pivot nut 18 is held in place in a respective bore or hole 22, with the pivot nut 18 being adapted to pivot about its longitudinal axis.

Each of the elongate rods 14 has right handed screw threads extending inwardly from one end thereof and left handed screw threads extending inwardly from the other end. The screw threads on one end of each rod 14 engage a mutually respective pivot nut 18 in a respective oblong opening 16 of one of the mounting plates 12, with the screw threads on the other end of such rod 14 engaging a mutually respective pivot nut 18 in a respective oblong opening 16 of the other mounting plate 12. Means are provided for rotating each of the pair of rods 14. As illustrated, hand knobs 26 are provided on one end of each of the rods 14 for rotating the rod 14. As the rods 14 are rotated, the two mounting plates 12 move to and fro, toward and away from each other.

Because of the pivoting nature of the pivot nuts 18, the mounting plates 12 can be canted to a certain degree with respect to each other as they move to and fro. Otherwise, the plates 12 would bind on the threaded rods 14 and be hard to move unless the rods 14 were rotated in almost the same identical fashion. The limited pivoting ability that the rods 14 have relative to the mounting plates 12 permit ready operation of the rods 14 even with varied speeds of rotation relative to each other, without binding the plates 12 on the rods 14. Due to the parallel motion along the pair of spaced rods 14, such rods 14 being parallel to each other, the respective plates are symmetrical about a plane which is perpendicular to the longitudinal axis of either of the rods 14 and which passes through a midpoint in the rods 14 between the two plates 12.

Engagement pad members 30 are attached to mutually respective, bottom sides of the pair of plates 12. Each set of pad members 30 are adapted to engage opposite sides of a work piece 10 (FIGS. 1-3) in firm engagement therebetween when the pair of plates 12 are moved toward each other, with the work piece 10 being disengaged when the pair of plates 12 are moved away from each other. As illustrated, there are two pair of pad members 30, with the two pair being spaced from each other on the bottom sides of the pair of plates 12. Preferably, the pad members 30 take the form of multi-sided blocks which are pivotally mounted to the bottom sides of the respective mounting plates 12. As illustrated, at least some of the sides of the blocks forming the pads 30 are cut out with various shapes which approximate the common shapes along the sides of rails used in balustrades. The pads 30 can be rotated to position the side with the desired shape facing the rail or other work piece which is to be gripped.

In accordance with the first embodiment of the invention as mentioned above, a guide member 32 is provided which has means for guiding a boring tool 34 in linear movement toward and away from the working face of the work piece 10. Preferably, the guide member 32 is mounted to the pair of rods 14 at a position between the mounting plates 12. The guide member 32 has respective journal bearings which will be described more fully hereinafter, with the pair of rods 14 being received in the journal bearings for axial, rotational movement of the rods 14 relative to the guide member 32. Means are further provided for mounting the guide member 32 in a position between the pair of mounting plates 12 such that the linear movement of the boring tool 34 lies in a plane passing generally through the longitudinal axis of the work piece.

As illustrated, the guide member 32 comprises a support plate 36 which has a general broad, flat shape. As best shown in FIG. 9, the support plate 36 has a pair of spaced openings 38a and 38b which form the journal bearings through which the rods 14 pass. The upper opening 38a is preferably oblong in shape, with its longitudinal axis being parallel with the longitudinal axes of the openings 16 in the mounting plates 12. The oblong nature of the upper opening 38a supplies compensatory space for the upper rod 14 to move as it pivots relative to the mounting plates 12 which as explained above is advantageous in avoiding binding of the plates 12 as they move to and fro due to the rotation of the rods 14. The lower opening 38b is sized so as to accept the lower rod in snug engagement but free for rotational movement about the longitudinal axis of the rod 14.

Figure 5:
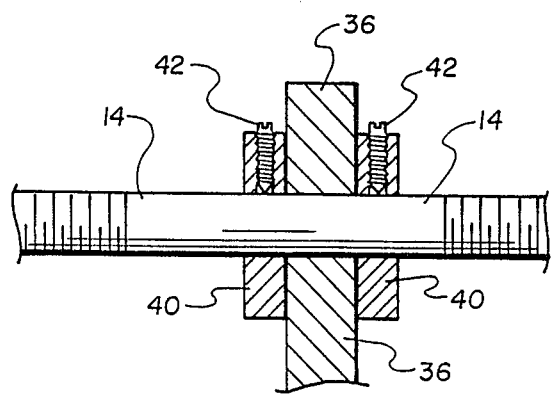
FIG. 5 is a cross section taken along line 5—5 of FIG. 2 showing a typical journal bearing attachment used in attaching the guide member to the pair of rods separating the mounting plates.

Positioning bushings 40 are firmly attached to each of the rods 14 (see in particular, FIG. 5) on opposite sides of the support plate 36 such that the support plate 36 is held in firm position relative to the rods 14. The plate 36 will not move longitudinally along the rods 14, and is fixed in immovable condition with respect to the lower rod 14. The upper rod 14 moves up and down in the oblong upper opening 38a along the elongate axis of the oblong upper opening 38a. This limited movement of the upper rod 14 within its respective bearing opening 38a is necessary to allow the pivotal movement of the rods relative to the mounting plates 12 as has been discussed above. The positioning bushings 40 are firmly secured to the respective rods 14 by set screws 42 (see FIG. 5).

As best illustrated in FIG. 2, an elongate journal bearing 38c is preferably formed by the lower opening in the support plate 36. The journal opening through the elongated bearing 38c has an elongate dimension greater than the general thickness of the plate 36. The increase in length of the journal opening in the elongated bearing 38c provides strength and stability to the attachment of the plate 36 to the lower rod 14. The elongate journal bearing 38c formed at the lower opening can be an integral, cylindrical extension from the sidewall of the plate 36, with the journal opening extending longitudinally through the cylindrical extension from the sidewall of the plate 36. An alternative embodiment is to provide an elongate bushing 38c as shown in FIG. 2 having the journal bearing extending therethrough, and to drill an oversized opening in the plate 36 into which the bushing 38c is firmly press fit. The positioning bushings 40 are then positioned adjacent to the ends of the elongate bushing 38c.

Figure 6:
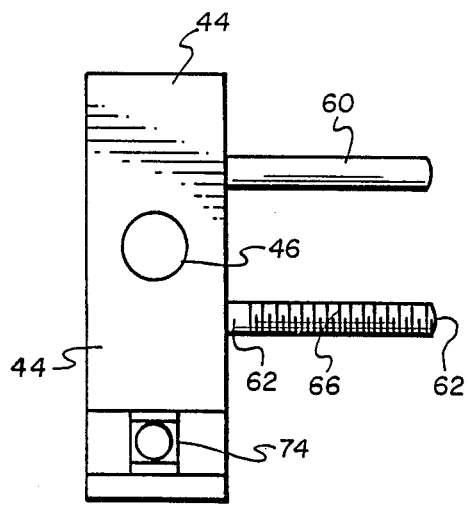
FIG. 6 is a top view of the guide block of either of the embodiments of the boring jig apparatus of FIGS. 1 or 3, with the boring tool being removed.

In the illustrated embodiment, the guide member 32 further comprises a guide block 44 which is attached to the side of the support plate 36. The guide block 44 has an elongate bore 46 (FIG. 6) extending therethrough which acts as a guidance bearing for a shaft of a boring tool 34 such that the shaft of the boring tool 34 can be moved back and forth within the bore 46 in the guide block 44 to move the boring tool 34 toward and away from the work piece 10. The shaft of the boring tool 4 passes through the bore 46 in the guide block 44 and extends from the upper side of the guide block 44 by several inches.

The upper, free end of the shaft is provided with means for attachment of a rotating drive, such as the chuck of a drill. A coil spring 50 is advantageously positioned around the shaft between the free end thereof and the upper side of the guide block 44. A bit 52 is attached to the other end of the shaft of the boring tool 34. The spring 50 biases the shaft in a position such that the bit 52 is normally positioned abutting the lower side of the guide block 44. When the drill or other rotating drive is pressed downwardly, the bit 52 moves into engagement with the work piece 10 and the coil spring 50 is compressed. The bit 52 can advantageously be removed from the lower end of the shaft and replaced with other bits of various sizes depending on the desired size of the bore which is to be formed in the work piece 10.

Means are preferably provided for moving the guide block 44 in an arcuate movement such that the angle between the direction of linear movement of the boring tool 34 and the longitudinal axis of the work piece 10 can be selectively varied. As illustrated, the support plate 36 has an arcuate track means thereon, and means are provided for attaching the guide block 44 to the track means for arcuate movement along the track means. The arcuate track means advantageously comprises an open slot 56 in the support plate 36, and the means for attaching the guide block 44 to the track means comprises a pair of spaced pins 60 and 62 extending from the guide block 44, with the pins 60 and 62 extending into the open slot 56 for translational movement therealong.

At least one of the spaced pins 60 and 62 has an external screw thread 66 which extends inwardly from its free end, and the threaded end passes through the slot 56 in the support plate 36. A locking bushing 68 is provided. The locking bushing 68 includes an opening therein that has internal screw threads which engage the external screw threads 66 of the threaded pin 62. Means, such as the handle 70 shown extending from the locking bushing 68, provides for (1) rotating the locking bushing 68 in one direction to advance the locking bushing 68 into locking engagement with the support plate so as to lock the guide block 44 in fixed position to the support plate 36, and (2) rotating the locking bushing 68 in the opposite direction to retract the locking bushing 68 from engagement with the face of the support plate 36 such that the guide block 44 is free to move along the slot 56 in the support plate 36.

It is advantageous to further provide means for indicating the position of the guide block 44 relative to the track means on the support plate 36. As illustrated, such means comprises an arcuate surface on the support plate 36 which is adjacent to the track means. A scale indicia in the form of spaced marks 72 is formed in the illustrated embodiment on the arcuate surface of the support plate 36. A cursor indicia is formed on the guide block such that the cursor indicia is adjacent to the scale indicia 72 and moves along the scale indicia 72 as the guide block 44 moves along the track means. As best shown in FIG. 1, the cursor indicia is advantageously formed by the straight edge of the side of the guide block 44 which abuts the support plate 36.

As shown in the drawings, it is further advantageous to provide the guide block 44 with a bubble tube 74 which can be used to indicate when the boring tool 44 is plumb regardless of the angle between the boring tool and the longitudinal axis of the workpiece. The bubble tube 74 is similar to the bubble tubes used in a conventional level. It is further advantageous to provide an indicia on at least one of the mounting plates 12 of the jig apparatus. The indicia comprises a cursor line 76 which extends from at or near the bottom side of the mounting plate 12 upwardly to and across a portion of the side opposite the bottom side, with the indicia coinciding with the transverse center line of the hole which is to be bored in the work piece 10.

Figure 7:
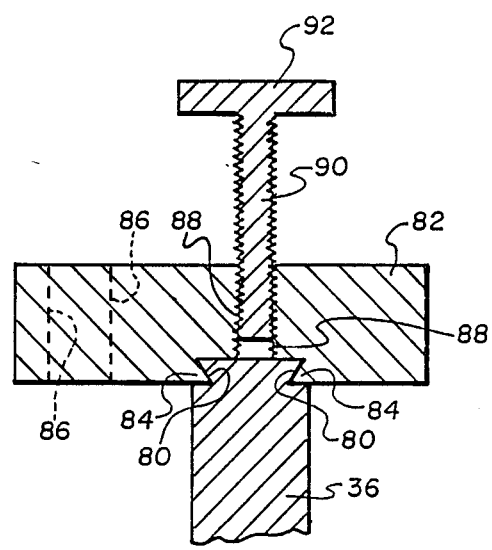
FIG. 7 is a cross section through the sliding connection of the guide member and the end plate and taken generally along line 7—7 of FIG. 3.

As was mentioned previously, a modified embodiment of the invention is shown in the drawings. The modified embodiment is referred to herein as the second embodiment, and as mentioned previously is shown in FIG. 3 in combination with the first embodiment of the invention. In accordance with the second embodiment, the support plate 36 has a substantially flat, forward side edge which extends in a direction substantially perpendicular to the working face of the work piece. A guide rail 80, as best shown in FIGS. 7 and 8 is formed along at least a portion of the forward side edge of the support plate 36.

An end plate 82 is provided having substantially broad forward and rear faces, upper and lower edges and opposite side edges. The end plate 82 further has a rail engaging means 84 extending along the rear face thereof. The rail engaging means 84 engages with the guide rail 80 for sliding movement of the end plate 82 along the guide rail 80. The end plate 82 has an opening 86 extending therethrough, with the opening 86 having an axis which lies in the same plane as the elongate bore 46 in the guide block 44. The axis of the opening 86 is also parallel with the working face of the work piece 10. The opening 86 acts as a guide for an elongate drill in boring a hole in the end of the work piece 10.

As illustrated, there is further provided means for releasably locking the end plate 82 to the guide rail 80 at any desired position along the guide rail 80. Preferably, the means for releasably locking the end plate 82 to the guide rail 80 comprises a opening 88 in the end plate 82. The opening 88 has internal screw threads. The opening 88 is further in alignment with and moves along the forward side edge of the support plate. A rod 90, having a screw thread extending inwardly from one of its ends, is threaded into the threaded opening 88, with one end of the rod 90 being adapted to make abutting engagement with the forward side face of the support plate 36. Means are provided for (1) rotating the rod 90 in a direction to advance the end of the rod 90 into firm engagement with the forward side edge of the support plate 82, thereby releasably locking the end plate 82 to the guide rail 80 on the support plate 36, and (2) rotating the rod 90 in the opposite direction to retract the end of the rod 90 from engagement with the forward side edge of the support plate 36 such that the end plate 82 is free to move along the guide rail 80 on the support plate 36. Preferably, a knob 92 is attached to the outer end of the rod 90 for manually manipulating and rotating the rod 90.

It is advantageous to provide means for indicating the position of the end plate 82 relative to the guide rail 80 on the support plate 36. As shown in FIG. 8, a scale indicia in the form of spaced marks 94 can be formed on the support plate 36 adjacent to the guide rail 80. A cursor is provided on the end plate 82 to lie adjacent to the scale indicia on the support plate 36. The cursor moves along the scale indicia on the support plate 36 as the end plate 82 moves along the guide rail 80. The cursor can conveniently be the top edge of the end plate 82 as shown in FIG. 8.

Although preferred embodiments of the jig apparatus of the present invention have been illustrated and described, it is to be understood that the present disclosure is made by way of example and that various other embodiments are possible without departing from the subject matter coming within the scope of the following claims, which subject matter is regarded as the invention.

I claim:

1. A jig used for precision boring of holes in a working surface of an elongate work piece, said jig comprising a pair of mounting plates;

means for connecting the mounting plates together in adjustable, spaced positions such that the mounting plates face each other and can be moved in a direction toward and away from each other;

engagement pad members attached to mutually. respective, bottom sides of said pair of mounting plates, said pad members being adapted to engage opposite sides of a work piece in firm engagement therebetween when the pair of mounting plates are moved toward each other, with the work piece being disengaged when the pair of mounting plates are moved away from each other;

a guide member having means for guiding a boring tool in a linear movement toward and away from a working face of said work piece, said guide member comprising a support plate and an associated guide block, with said support plate being mounted between said pair of mounting plates and said guide block having an elongate bore therethrough which acts as a guidance bearing for a rotatable shaft of a boring tool such that the shaft can be moved back and forth within said bore in the guide block to move the boring tool toward and away from said work piece; and means for mounting said guide block to said support plate in a position between said pair of mounting plates such that the linear movement of the boring tool lies in a plane passing generally through the longitudinal axis of said work piece, said means for mounting said guide block to said support plate comprising an arcuate track means on said support plate and attachment means which connect said guide block to said track means for arcuate movement of said guide block along said track means, with said track means being formed by an open slot in said support plate and said attachment means comprising a pair of spaced pins extending from said guide block into the open slot for translational movement along said slot, such that the angle between the direction of linear movement of the boring tool and the longitudinal axis of said work piece can be selectively varied.

2. A jig in accordance with claim 1, wherein the means for connecting the mounting plates together comprises
a pair of spaced, elongate connecting members; and
means for attaching the mounting plates to said elongate connecting members such that the mounting plates can move to and fro along said connecting members.

3. A jig in accordance with claim 2, wherein the support plate of said guide member is mounted to the pair of elongate connecting members at a position between the mounting plates.

4. A jig in accordance with claim 1, wherein the means for connecting the mounting plates together comprises
a pair of spaced, oblong openings in each of said mounting plates, with the longitudinal axis of one oblong opening in each plate being substantially parallel with the longitudinal axis of the other oblong opening in the mutually respective plate;
each oblong opening having a pivot nut mounted therein, wherein each said pivot nut has an internally threaded opening, and each said pivot nut is mounted for pivotal movement within the respective oblong opening such that the axis of the threaded opening thereof moves in a plane which is parallel to the longitudinal, central axis of the respective oblong opening and perpendicular to said working face of said work piece;
pair of elongate rods, each rod having right handed screw threads extending inwardly from on end thereof and left handed screw threads extending inwardly from the other end, with the screw threads on one end of each rod engaging a mutually respective pivot nut in a respective oblong opening of one of the mounting plates and the screw threads on the other end of such rod engaging a mutually respective pivot nut in a respective oblong opening of the other mounting plate; and
means for rotating each of said pair of rods.

5. A jig in accordance with claim 4, wherein the support plate of said guide member is mounted to the pair of rods at a position between the mounting plates, with the support plate having respective journal bearings through which the pair of rods are received such that the pair of rods are free for axial, rotational movement relative to said support plate.

6. A jig in accordance with claim 5, wherein the support plate has spaced openings which form said journal bearings through which the respective rods pass and positioning bushings are firmly attached to each of the rods on opposite sides of said support plate such that the support plate is firmly held in position relative to said rods.

7. A jig in accordance with claim 1, wherein
at least one of said spaced pins has an external screw thread and extends through the slot in said support plate;
a locking bushing is provided, said locking bushing including an opening therein that has internal screw threads which engage the external screw threads of said one spaced pin; and
means are provided for (1) rotating the locking bushing in one direction to advance said locking bushing into locking engagement with said support plate so a to lock the guide block in fixed position to said support plate, and (2) rotating the locking bushing in the opposite direction to retract said locking bushing from engagement with the face of said support plate such that said guide block is free to move along said slot in said support plate.

8. A jig in accordance with claim 7, wherein said means for rotating the locking bushing comprises a handle extending outwardly from said locking bushing.

9. A jig in accordance with claim 1, wherein means are provided for indicating the position of the guide block relative to the track means on said support plate.

10. A jig in accordance with claim 9, wherein said means for indicating the position of the guide block relative to the track means comprises
an arcuate surface on said support plate which is adjacent to said track means;
a scale indicia in the form of spaced marks formed on the arcuate surface; and
a cursor indicia formed on said guide block such that the cursor indicia is adjacent to said scale indicia and moves along said scale indicia as said guide block moves along said track means.

11. A jig in accordance with claim 1, wherein the guide block is provided with a bubble tube which can be used to indicate when the guide block is in a position such that the boring tool associated with the guide block is oriented to be plumb regardless of the angle between the guide block bore and the longitudinal axis of said work piece.

12. A jig in accordance with claim 1, wherein said support plate has a substantially flat, forward side edge which extends in a direction substantially perpendicular to the working face of the work piece, and said jig further includes
a guide rail formed along at least a portion of the forward side edge of said support plate;
an end plate having substantially broad forward and rear faces, upper and lower edges and opposite side edges, said end plate further having a rail engaging means extending along the rear face of said end plate, said rail engaging means engaging with said guide rail for sliding movement of said end plate along said guide rail; and
an opening extending through said end plate, with said opening having an axis which lies in the same plane as the elongate bore in said guide block and which is parallel with the working face of said work piece,
whereby said opening acts as a guide for an elongate drill in boring a hole in the end of said work piece.

13. A jig in accordance with claim 12, wherein there is further provided means for releasably locking the end plate to the guide rail at any desired position along the guide rail.

14. A jig in accordance with claim 13, wherein the means for releasably locking the end plate to the guide rail comprises
a threaded opening in said end plate which is provided with internal screw threads and is in alignment with and moves along the forward side edge of said support plate;
a rod having a screw thread extending inwardly from one of its ends, with the one end of said rod being received within the threaded opening in said end plate for engagement with the internal screw threads therein; and means for (1) rotating said rod in a direction to advance said one end of the rod into firm engagement with the forward side edge of said support plate to releasably lock the end plate to the guide rail on said support plate, and (2) rotating said rod in the opposite direction to retract said one end of the rod from engagement with the forward side edge of said support plate such that the end plate is free to move along the guide rail on said support plate.

15. A jig in accordance with claim 14, wherein said means for rotating the rod within the threaded opening in said end plate comprises a knob attached to the other end of said rod.

16. A jig in accordance with claim 12, wherein means are provided for indicating the position of the end plate relative to the guide rail on said support plate.

17. A jig in accordance with claim 16, wherein said means for indicating the position of the end plate relative to the guide rail on said support plate comprises
a scale indicia in the form of spaced marks formed on the support plate adjacent to the guide rail; and
a cursor means on said end plate such that the cursor means lies adjacent to said scale indicia on said support plate and moves along said scale indicia on said support plate as said end plate moves along said guide rail.

18. A jig in accordance with claim 1, wherein the engagement pad members comprise
a pair of multi-sided blocks attached to the bottom sides of each of said pair of plates such that the blocks can be rotated to select particular sides of said blocks to make engagement with the opposite sides of said work piece.

19. A jig in accordance with claim 1, wherein there is further provided an indicium on at least one of the mounting plates of said pair of mounting plates, said indicia being located adjacent to the bottom side of said mounting plate, with the indicia coinciding with the center line of the hole which is to be bored in said work piece.

20. A jig in accordance with claim 1, wherein said engagement pads are attached to said pair of plates such that the pads can be readily removed and interchanged with alternative pads.

* * * * *